(12) United States Patent
Burgess

(10) Patent No.: US 6,493,441 B1
(45) Date of Patent: *Dec. 10, 2002

(54) METHOD OF CONTROLLING TELECOMMUNICATIONS SIGNALLING

(75) Inventor: Scott Burgess, Lake Worth, FL (US)

(73) Assignee: Siemens Information and Communication Networks, Inc., Boca Raton, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/720,123

(22) Filed: Sep. 27, 1996

(51) Int. Cl.[7] ................................................ H04M 3/00
(52) U.S. Cl. ...................... 379/188; 379/189; 379/196; 379/282; 379/93.02; 379/93.04
(58) Field of Search ................................ 379/386, 282, 379/283, 286, 257, 354, 355, 190, 191, 192, 189, 196, 197, 198

(56) References Cited

U.S. PATENT DOCUMENTS

| | | | | |
|---|---|---|---|---|
| 4,188,508 A | * | 2/1980 | Rogers et al. | 379/189 |
| 4,284,851 A | * | 8/1981 | Schweitzer et al. | 379/189 |
| 4,313,038 A | * | 1/1982 | Nilssen et al. | 379/283 |
| 5,289,521 A | * | 2/1994 | Coleman et al. | 379/52 |
| 5,327,492 A | * | 7/1994 | Parola | 379/361 |
| 5,392,348 A | * | 2/1995 | Parik et al. | 379/386 |
| 5,559,874 A | * | 9/1996 | Panosh | 379/189 |
| 5,694,461 A | * | 12/1997 | Lee | 379/196 |
| 5,724,404 A | * | 3/1998 | Garcia et al. | 379/34 |

* cited by examiner

Primary Examiner—Fan Tsang
Assistant Examiner—Ovidio Escalante

(57) ABSTRACT

A method for inhibiting the use of dual tones over an established voice channel of a telecommunications network. The method inhibits a call tone by removing at least one frequency selected from a group of frequencies used for in-band signaling. The method may also determine a time for inhibiting the call tone.

24 Claims, 12 Drawing Sheets

FIG. 5

| DIGIT | LOW FREQUENCY | HIGH FREQUENCY | HEX OUTPUT |
|---|---|---|---|
| 1 | 697 Hz | 1209 Hz | 0001 |
| 2 | 697 Hz | 1336 Hz | 0010 |
| 3 | 697 Hz | 1477 Hz | 0011 |
| 4 | 770 Hz | 1209 Hz | 0100 |
| 5 | 770 Hz | 1336 Hz | 0101 |
| 6 | 770 Hz | 1477 Hz | 0110 |
| 7 | 852 Hz | 1209 Hz | 0111 |
| 8 | 852 Hz | 1336 Hz | 1000 |
| 9 | 852 Hz | 1477 Hz | 1001 |
| 0 | 941 Hz | 1209 Hz | 1010 |
| * | 941 Hz | 1336 Hz | 1011 |
| # | 941 Hz | 1477 Hz | 1100 |
| A' | 697 Hz | 1633 Hz | 1101 |
| B' | 770 Hz | 1633 Hz | 1110 |
| C' | 852 Hz | 1633 Hz | 1111 |
| D' | 941 Hz | 1633 Hz | 0000 |

METHOD OF CONTROLLING TELECOMMUNICATIONS SIGNALLING

FIELD OF THE INVENTION

The present invention relates to the communication of signaling information across a telecommunications network, such as the public switched telephone network.

BACKGROUND OF THE INVENTION

In telecommunications systems, signaling performs three basic functions; namely (1) supervising functions, (2) alerting functions, and (3) addressing functions. Signaling for supervising functions monitors the status of a transmission line or circuit to determine its state (i.e., whether it is busy, idle, requesting service, etc.). Voltage levels, tones or data bits for example, are used for supervising function signals. Signaling for alerting functions is used, for example, to indicate the arrival of an incoming call with e.g., bells, buzzers, tones, strobes, lights, etc. Signaling for addressing functions is used to route signals over the network with, for example, dial pulses, tone pulses, and data packets.

Today, most signaling is carried out "in-band" (i.e., it goes along and occupies the same circuits as those which carry voice conversations). Such in-band signaling is usually carried out with multifrequeny or single frequency signals. Unfortunately, many toll calls are not completed because the called phone does not pick up or is busy. Consequently, the circuit time used in signaling, which is substantial and expensive, becomes wasteful. Out-of-band signaling (such as signaling system 7, or "SS7") uses circuit(s) separate from voice circuits, for signaling functions.

Although one skilled in the art understands the station equipment and transmission facilities used by Regional Bell Operating Companies (or "RBOCs"), a brief overview of such station equipment and transmission facilities is provided below for the reader's convenience.

FIG. 1 illustrates the use of transmission facilities by various types of services. As shown in FIG. 1, a number of geographically remote central switching offices 120 are coupled via "trunks" 114 and interoffice transmission facilities 118. Various entities, such as residences 102, businesses 104, and private branch exchanges (or "PBXs") 106 are coupled with a central switching office 120 via "lines" 110, 112 and "loop transmission facilities" 108.

Thus, a loop transmission facility (or "subscriber loop") 108 connects telecommunication equipment at a customer premises (e.g., a residence, business, etc.) with an associated central switching office 120. The loop transmission facility 108 is typically on the order of a few miles and usually includes paired copper wire. Interoffice transmission facilities 118, or trunks, connect different central switching offices 120. Interoffice transmission facilities 118 range from less than one mile to thousands of miles.

FIG. 2 is a block diagram showing the connection of two pieces of terminal equipment at customer premises served by separate central offices. Terminal equipment X 202 (such as a telephone or modem for example) is coupled with central office A 206, via loop 208. Similarly, terminal equipment Y 204 is coupled with central office B 210, via loop 212. Central office A 206 is coupled with central office B 210 via trunk lines 214. If all of the trunk lines 214 are busy, central offices A and B, 206 and 210, respectively, may be coupled via trunks 216 and 220 and tandem office C 218.

The flow diagram of FIGS. 3a through 3d illustrates steps involved with initiating a call from terminal equipment X 202 to terminal equipment Y 204, processing the call, and terminating the call, in a system using "in-band" signaling. For the purposes of the following discussion, it will be assumed that the terminal equipment X 202 and Y 204 are telephones. However, the terminal equipment X 202 and Y 204 may be other types of equipment, such as a modem for example.

FIG. 3a shows actions taken at the telephone X 202 and the central office A 206 in initiating the call. First, as shown step 302, when the handset of telephone 202 is lifted, it sends an off-hook signal to the central office A 206 via loop 208. At central office A 206, a change from on-hook to off-hook status is detected. More specifically, when the telephone X 202 is taken off-hook, a circuit is established and the central office A 206 detects a DC current flowing through the established circuit. As shown in step 304, this change in status is interpreted as a request for service. Next, as shown in step 306, assuming that an originating register is available to accept and store the digits to be dialed by telephone X 202, the central office A 206 connects a dial tone signal to the telephone X 202 via loop 208. Line side equipment 234, such as an analog line unit (or "ALU") or a digital line unit (or "DLU") for example, provides the dial tone signal. As shown in step 308 a number is then dialed at telephone X 202. In response, as shown in steps 310 and 312, once the first digit of the number is recognized, the dial tone is disconnected and the numbers are stored in the originating register.

FIG. 3b shows actions taken at the central office A 206 in processing the call. First, as shown in step 314, control equipment at central office A 206 translates the dialed number. The control equipment performs this translation with a dual tone multiple frequency decoder (or DTMF) receiver which is discussed in more detail below. As shown in step 316, by examining the leading digits (e.g., the first three digits) of the dialed number, the control equipment determines whether the call is to another central office (i.e., an "inter-office" all) or to a subscriber serviced by the same central office (i.e., an intra-office call). In this example, it is assumed that the call is to telephone Y 204 which is served by a separate central office; namely, central office B 210. Next, as shown in step 318, routing information stored in the system indicates which paths (or "trunk groups") are appropriate and translates the desired paths to representations of physical locations of terminations of the trunks. As shown in step 320, if the call is billable, an automatic message accounting (or "AMA") register is requested to enable the telephone service provider to bill the appropriate parties. Next, as shown in step 322, the call information is transferred to an outpulsing register and the originating register is released. Then, as shown in step 324, the control equipment at central office A 206 begins scanning outgoing trunks to find an idle trunk to central office B 210.

If an idle trunk is found, as indicated in step 326, the call be transmitted directly from central office A 206 to central office B 210 via a free trunk 214. If, on the other hand, all trunks 214 from central office A 206 to central office B 210 are busy, then outgoing trunks 216 to tandem switching office C 218 are scanned such that the call may be routed from central office A 206 to central office B 210 via tandem switching office C 218.

FIG. 3c illustrates the actions taken to advance the call to the terminating central office; namely central office B 210. First, as shown in step 328, the idle trunk found in step 326 is seized. In response, as shown in steps 330 and 336, at central office B 210, an incoming register of a switch is seized and control equipment sends a ready signal back to central office A to indicate that the seized incoming register is ready to receive address information. In the meantime, as shown in step 332, at central office A 206, the line of telephone X 202 is connected, via the loop 208 and a switching network within central office A 206, to the seized trunk. In addition, as shown in step 334, control equipment at central office A 206 scans the outgoing trunk for the ready signal.

As shown in steps 338 and 340, when the ready signal sent by central office B 210 is received and detected by central office A 206, the call information is communicated from the outpulsing register of central office A to the seized incoming register of central office B 210. Next, as shown in step 342, before the last digit of the dialed number is sent, the control equipment at central office A 206 checks to see if telephone X 202 is still off-hook. If telephone X 202 is on-hook, the call is abandoned and the control equipment at central office A will terminate the call processing sequence and release associated equipment and circuits (e.g., seized registers, trunks, etc.). If, on the other hand, telephone X 202 is still off-hook, as shown in steps 344 and 346, the last digit of the dialed number is transmitted from the outpulsing register of central office A 206 to the incoming register at central office B 210 and the outpulsing register of central office A 206 is released.

FIG. 3d illustrates the actions taken to complete the call. First, as shown in step 350, the digits of the called number stored in the incoming register of the central office B 210 are translated to a physical location of the termination of the loop 212 of telephone Y 204 at central office B 210. Next, as shown in step 352, the status of the loop 212 of telephone Y 204 is checked to determine whether it is idle or busy. If the loop 212 is busy (i.e., telephone Y 204 is off-hook), a busy signal is returned to telephone X 202 via the switching network of central office B 210, trunk 214, the switching network of central office A 206, and loop 208. However, for purposes of this example, it is assumed that the loop 212 of the telephone Y 204 is idle (i.e., telephone Y is on-hook). In such a case, the incoming trunk 214 is coupled with the loop 212 of telephone Y 204 via the switching network of central office B 210. Next, as shown in steps 356, 358, and 360, a ringing register in central office B 210 is seized, the incoming register which stored the dialed number is released, and a ring signal is enabled. The ring is generated by the control equipment. As shown in steps 362 and 364, the ring signal causes an audible ring to be transmitted to telephone X 202 (via the switching network of central office B 210, trunk 214, the switching network of central office A 206, and loop 208) and causes telephone Y 204 to ring (via loop 212). Control equipment at central office B 210 monitors the status of the telephone Y 204. If the handset of the telephone Y 204 is taken off-hook (see step 366) the ringing signal is disabled. The conversation then begins. Further, as shown in step 368, answer supervision, used to record answer or connect time for billable calls, is provided by control equipment at central office A 206.

As shown in step 370, control equipment at central office A 206 monitors the outgoing trunk 214 for disconnect. The call is terminated if either telephone X 202 or telephone Y 204 is hung up, i.e., if its handset is placed on-hook. If the calling party, i.e., telephone X 202, hangs up first, the connection is released (see step 374), and disconnect supervision is sent to central office B 210. The trunk is then idled when central office B returns on-hook supervision. If, on the other hand, the called party, i.e., telephone Y 204, hangs up first, a timed release period of 10 to 11 seconds is initiated. Finally, as shown in steps 372 and 374, upon the expiration of this timed release period, the connection is released.

The above example describes an inter-office call. An intra-office call is handled similarly except that an idle trunk line is not needed. Basically, for intra-office calls, steps 314, 316, 318, 320, 322, 324, 326, 328, 330, 332, 334, 336, 338, 342, 344, and 346 are not performed. Moreover, steps 350, 352, 354, 356, 358, 360, 364, 366, and 372 are all performed at central office A.

To reiterate, the above described flow diagram of FIGS. 3a through 3d illustrates the steps involved with initiating a call from terminal equipment X 202 to terminal equipment Y 204, processing the call, and terminating the call, in a system using "in-band" signaling. Many present day inter-office networks now use out-of-band signaling such as SS7 signaling to "set up" (or establish) and tear down (or terminate) a call. SS7 is used to send messages between remote switching equipment. SS7 is advantageous because it uses separate circuits for signaling and voice data. To reiterate, in the previous systems, the same circuit was used for both signaling and voice data. Such previous systems were disadvantageous because if a circuit was being used for signaling, it could not be used for voice. On the other hand, with SS7, voice trunks are only used when a connection is established.

FIG. 4 illustrates the process of setting up (or establishing) a call 400 in a communications system using SS7. First, as shown in step 402, a caller goes off-hook. Again, the off-hook status of the loop is assumed by the central office based on a DC current through the loop, and the central office returns a dial tone signal to the caller. Next, as shown in step 404, the caller dials digits which causes pulses or DTMF signals to be sent to the central office.

For the purposes of describing the present invention, it will be assumed that the dialed digits will be represented by DTMF signals. As shown in FIG. 5, Each of the digits 0 through 9, as well as the star "*" the an the pound sign "#", are represented by a pairing of one of four (4) low frequencies (697, 770, 852, or 941 Hz) with one of three (3) high frequencies (1209, 1336, or 1477 Hz). Since such signaling is "in-band", and since the frequencies are within the range of human voice, the digits are represented by a paired low and high frequency to avoid having the human voice inadvertently imitating or "falsing" one of the DTMF signals. Next, as shown in step 406, the dialed digits are received and decoded by equipment at the central office. Such equipment may include a standard DTMF decoder such as a model M-8870 DTMF Receiver sold by Teltone.

Next, as shown in step 408, if available, a signaling trunk to the destination office is seized based on a routing table and the decoded dialed digits. As shown in steps 410, 412, and 414, if the dialed equipment is off-hook (i.e., if the line is busy), (i) the destination office signals the central office that the line is busy and (ii) the central office provides busy signal ones to the caller. On the other hand, as shown in steps 410, 416, and 418, if the dialed equipment is not off-hook, (i) the destination office provides ring to the called equipment, (ii) the destination office signals the central office that the line is free, and (iii) the central office provides a ring signal to the caller.

Next, as shown in steps 420 and 422, if the called equipment has gone off-hook, i.e., if the called equipment answers the ring, a connection is established; that is, a voice circuit is seized. If, on the other hand, the called equipment has not gone off-hook, the ringing continues until the attempted call is terminated (not shown).

In both systems using in-band signaling and systems using out-of-band signaling, once a voice channel is established, present telephone networks do not control the use of call tones such as DTMF tones. This has a number of disadvantages. First, many end-users have integrated voice response units (or "IVRUs") which provide a hierarchical voice menu prompting the other party for call tone entries. For example, an insurance company may use an IVRU to query a caller for their insurance number, claim number, etc. A mail order catalog company may use an IVRU to query a caller for an item number, a quantity number, and a credit card number. The telephone network cannot prevent children from placing unauthorized orders or prevent others from unauthorized access in such systems —the responsibility lies with the end user using an IVRU. This leads to non-uniform protection for callers interacting with such IVRUS.

Second, dial pulse users can abuse the phone system if the telephone network cannot control call tones once a call is set up. More specifically, dial pulse users pay a lower usage fee for their telephone service than touch-tone users. Many telephones may be switched between a pulse output and a dial tone output. Some dial pulse users use the pulse mode of their phone to set-up a call (i.e., dial a number) and then switch their telephone to dial tone output to interact with IVRUs or to send data. Telephone networks are therefore deprived of the revenue reflected in the difference between dial pulse and touch tone rates. This may lead to increased costs for non-abusive telephone users. Moreover, dial pulse calls take more time to process. Such additional switch processing time does not generate any additional revenue for the telephone company—in fact, if the call is not completed, no revenue is generated at all since billing does not start. Accordingly, the telephone networks would like to have more people use touch tone, and to have pulse tone users switch over to touch tone service.

Finally, telephone networks are designed for voice use and tolls are formulated assuming voice use—they are not designed for data transmission, via e.g., call tones. Thus, using call tones for in-band signaling once the voice channel is established may put increased demands on telephone networks without generating revenue commensurate with those increased demands. Again, this may lead to the need to increase the rates of all subscribers; not just those using call tone signals after a voice channel is established.

In view of the foregoing, a method is needed, for example, to: (i) prevent children from placing unauthorized orders or prevent others from unauthorized access via IRVUs; (ii) prevent dial pulse users from abusing the phone system; and (iii) permit telephone networks to generate revenue commensurate with increased demands due to the use of call tones for in-band signaling once the voice channel is established.

SUMMARY OF THE INVENTION

The present invention obviates the aforementioned problems by providing a method for inhibiting the use of dual tones over an established voice channel. The present invention does so by inhibiting at least one call tone by removing at least one frequency selected from a group consisting of 697 Hz, 770 Hz, 852 Hz, 941 Hz, 1209 Hz, 1336 Hz, 1477 Hz, and 1633 Hz. One or more other frequencies used for in-band signaling may also be filtered out. This may be done with a notch filter or a DSP for example. Such filtering is applied continuously, periodically, or intermittently.

Alternatively, at least one frequency selected from a group consisting of 697 Hz, 770 Hz, 852 Hz, and 941 Hz is removed and at least one frequency selected from a group consisting of 1209 Hz, 1336 Hz, 1477 Hz, and 1633 Hz is removed.

In each of the above methods, the present invention may determine a time for inhibiting the call tone(s). This step may be done by (a) determining when a call has been set up, (b) determining when dialing is complete and waiting a predetermined period of time, (c) receiving dialed digits, counting the dialed digits received to form a number, and determining when the number of received dialed digits exceeds a predetermined number, or (d) determining when a voice is present on a voice circuit.

BRIEF DESCRIPTION OF THE DRAWINGS

For a better understanding of the invention, reference is made to the following description of an exemplary embodiment thereof, and to the accompanying drawings, wherein:

FIG. 5 is a table showing the low and high frequency pairs used to represent digits with dual tone signals;

DETAILED DESCRIPTION

The present invention provides a method for inhibiting call tones in response to a particular event, such as upon the completion of call set-up for example. To understand when a call set-up is complete, some background discussion is helpful.

Figure 11:
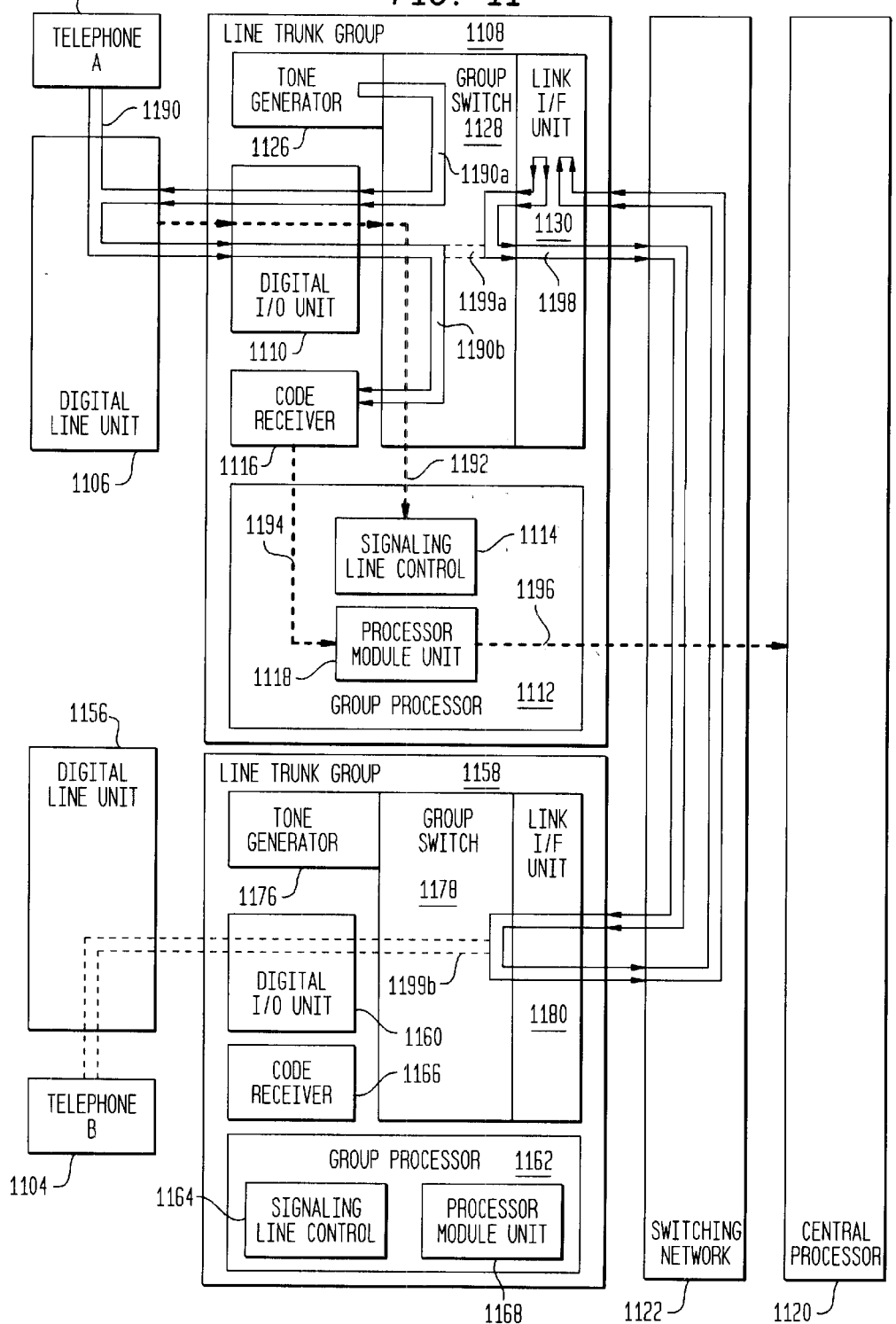
FIG. 11 is a block diagram of devices used to set-up an intra-office call.

FIG. 11 is a block diagram of an EWSD switch, sold by Siemens Stromberg-Carlson, in which dialing and connection operations are shown. Each of the line trunk groups 1108 and 1158 includes (i) a digital interface unit 1110 or 1160, (ii) a group switch (or peripheral switch matrix) 1128 or 1178, (iii) a link interface unit 1130 or 1180, (iv) a group processor 1112 or 1162, (v) a tone generator 1126 or 1176, and (vi) a code receiver 1116 or 1166. The digital interface units 1110 and 1160 adapt incoming Ti carriers from the digital line units 1106 and 1156, respectively, to internal speech and signaling paths of their line trunk groups 1108 and 1158, respectively. The group switches 1128 and 1178 are non-blocking switching stages which interconnect the functional units of their line trunk groups 1108 and 1158, respectively, via speech paths. The link interface units 1130 and 1180 transmit speech and data from the group switches 1128 and 1178, respectively, over a 128 channel carrier to and from switching network(s) 1122. The group processors 1112 and 1162 are microprocessor based units that control all activities of their line trunk groups 1108 and 1158, respectively. The tone generators 1126 and 1176 generate multi-frequency DTMF and MF-R1 tones for line and trunk signaling. The code receivers 1116 and 1166 detect the multi-frequency DTMF and MF-R1 tones used for subscriber line and trunk signaling.

In the following example, it is assumed that a line has already been seized by telephone A 1102 and a dial tone has been provided, via path 1190a, to telephone A 1102.

At telephone A 1102, the subscriber enters digits by pressing push-buttons of the telephone's keypad. The digital line unit 1106 detects the first digit and sends two messages to the group processor 1112. The first message, provided to the signaling line control unit 1114 via signal path 1192, asserts that a digit has been detected. The second message contains signals (or bits) defining the first digit. More specifically, a DTMF generator at the telephone A 1102 generates a dual tone in response to the push-button pressed by the subscriber. This dual tone is sent, in-band, via digital I/O unit 1110 and group switch 1128, to code receiver 1116. The code receiver 1116 decodes the dual tone, in-band, signal and provides the decoded value to the processor module unit 1118 via signal path 1194.

Subsequent digits are similarly provided to the processor module unit 1118. Once the processor module unit 1118 determines that the digits are sufficient for interpretation, it sends the digits, via signal path 1196, to the central processor 1120. The central processor 1120 queries an appropriate data base to determine port assignments for the line trunk group 1158 and digital line unit 1156 of telephone B 1104. The port assignments are then marked busy and the central processor commands the switching network 1122 to establish a path between the assigned speech channels in the line trunk groups 1108 and 1158.

Figure 12:
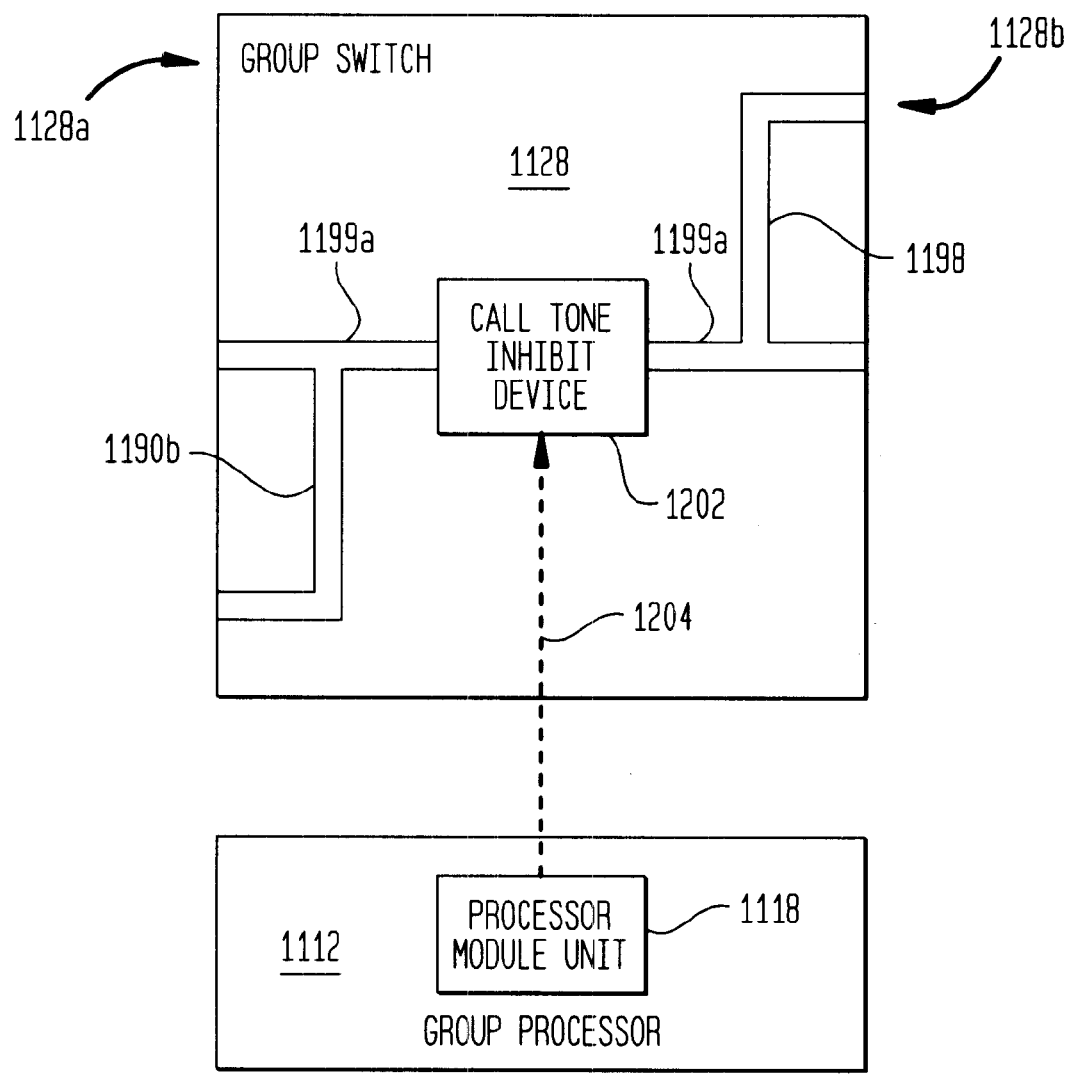
FIG. 12 is a block diagram which illustrates an example of where a call tone inhibit device may be located.

Assuming that telephone B goes off-hook in response to ringing signals from tone generator 1176, a voice channel between telephones A and B 1102 and 1104, respectively, is established via paths 1190b, 1199a, 1198, and 1199b. The call tone inhibiting device of the present invention should be arranged at some point in this voice channel. Preferably, as shown in FIG. 12, the call tone inhibiting device 1202 of the present invention would be arranged the group switch 1128 (and/or 1178) and would be controlled by the processor module unit 1118 (and/or 1168) of the group processor 1112 (and/or 1162). If the call tone inhibit device 1202 is implemented with a digital signal processor (or "DSP"), as discussed below, such a DSP may also perform the control function. That is, the DSP (e.g., a TMS320C31 chip by Texas Instruments) may control when it inhibits a call tone(s). Although one call tone inhibit device 1202 may be provided for each line, on the non-concentrated side 1128a of the group switch 1128 (or in the digital line unit 1106 or in the digital interface unit 1110), it is preferable to arrange the call tone inhibit devices 1202 on the concentrated side 1128b of the group switch 1128 so that less call tone inhibit devices 1202 are needed.

Figure 9:
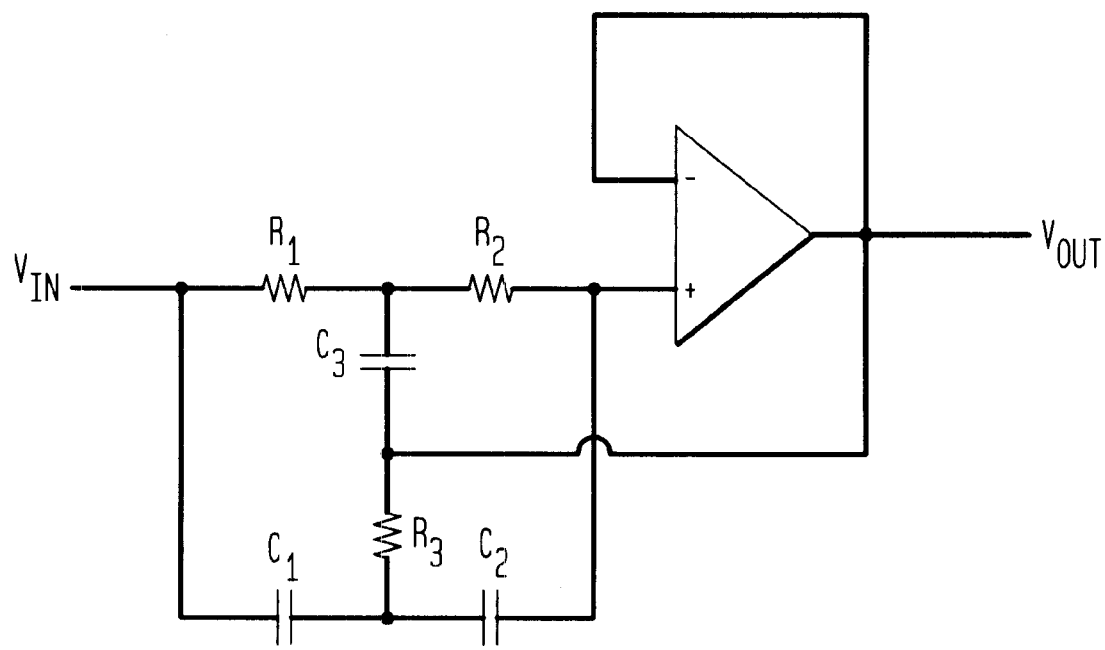
FIG. 9 is a schematic diagram of a notch filter for performing the call tone inhibit function.
Figure 10:
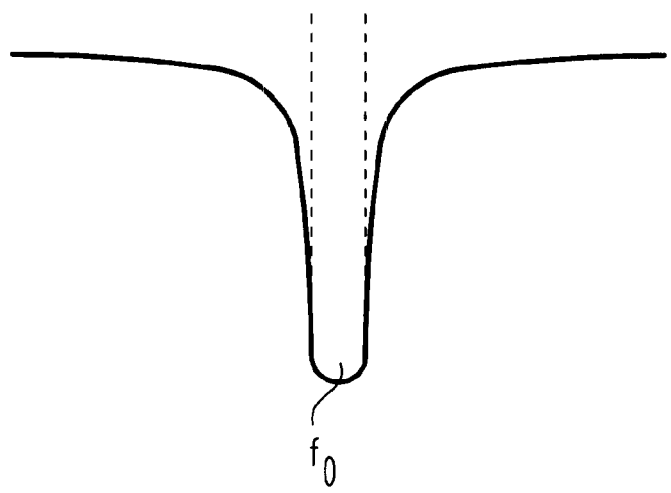
FIG. 10 is a frequency response plot for the notch filter of FIG. 9.

If the call tone inhibiting device(s) of the present invention is placed in the digital line unit 1106 before the analog voice channel is converted to digital, a notch filter(s) as shown in FIG. 9, having the frequency characteristic shown in FIG. 10, may be used. In the notch filter of FIG. 9, the blocked frequency $f_0=1/(2\Pi R_1 C_1)$, where $R_1=R_2=2R_3$ and $C_1=C_2=C_3/2$.

If, on the other hand, the call inhibiting device of the present invention is to accept digitized voice signals, a digital signal processor (e.g., a TMS320C31 chip by Texas Instruments) may be used to remove a particular frequency (s). In either case, each of the high frequencies (1209, 1336, and 1477 Hz) and each of the low frequencies (697, 770, 852, band 941 Hz) used to represent the digits "0" through "9" may be removed. More preferably however, since the high frequencies or low frequencies, taken alone, do not convey information decodeable by a DTMF receiver, only the high frequencies or only the low frequencies may be filtered. Even more preferably, one or more of each of the high and low frequencies may be filtered such that most, but not all dual tone signals are inhibited. For example, if 852 Hz and 1447 Hz were filtered out, dual tones corresponding to the digits 3, 6, 7, 8, 9, and the pound sign "#" would be removed. Although some dual tones would not be inhibited, as a practical matter, the use of in-band dual tone signaling would become almost useless in most applications. Most preferably, the call tone inhibit device of the present invention will only filter out the 697 Hz frequency. This would remove dual tones corresponding to digits 1, 2, and 3, which are often used by automated voice response units to provide hierarchical menus, and which are used in many social security numbers. By limiting the frequency(s) filtered, the call tone inhibit unit of the present invention is less expensive and easier to implement, and less of the voice frequency spectrum will be removed. Once invoked, the filter(s) may be applied continuously, periodically or intermittently, during the call.

Figure 1:
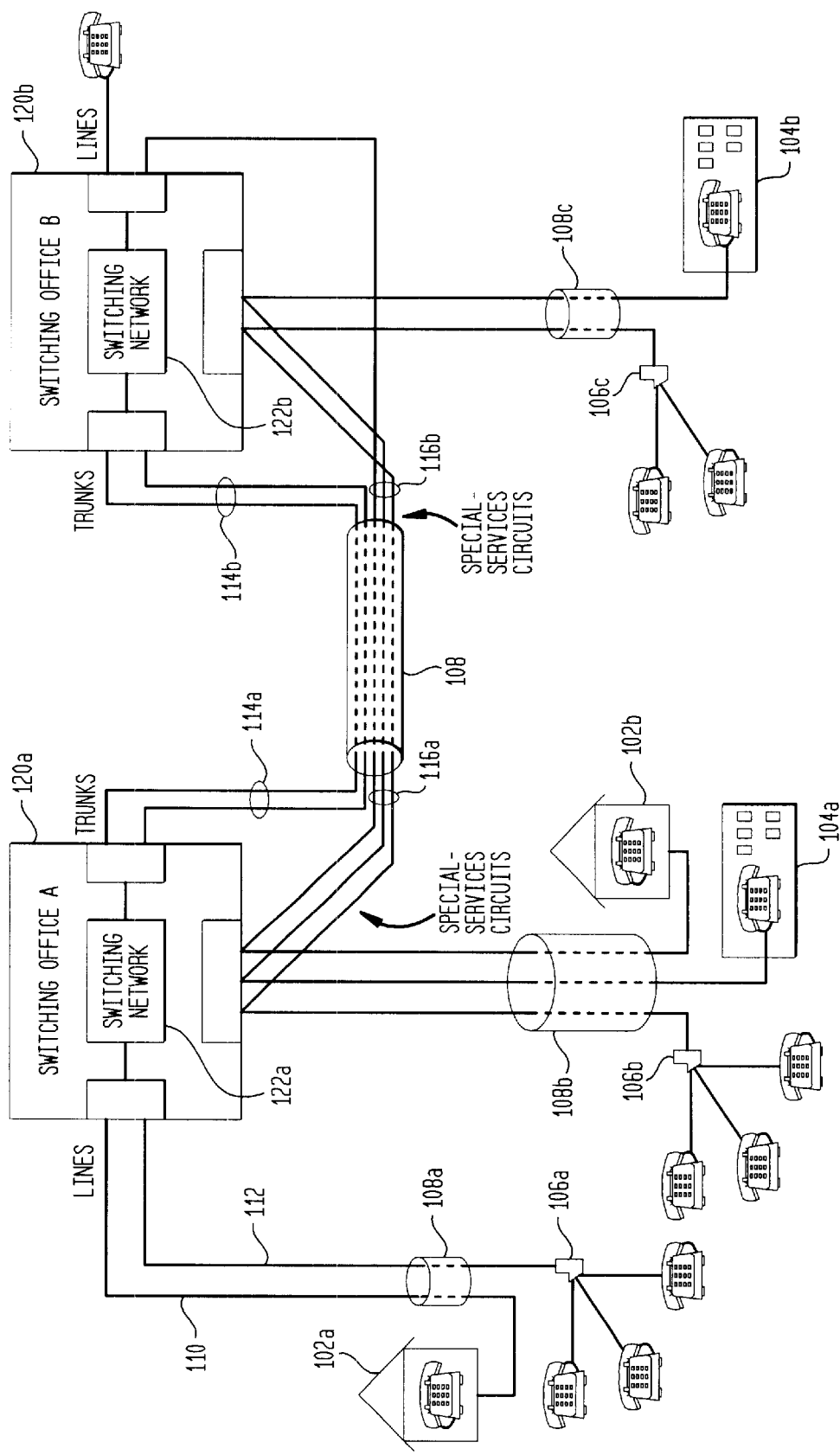
FIG. 1 illustrates the use of transmission facilities by various types of services.
Figure 2:
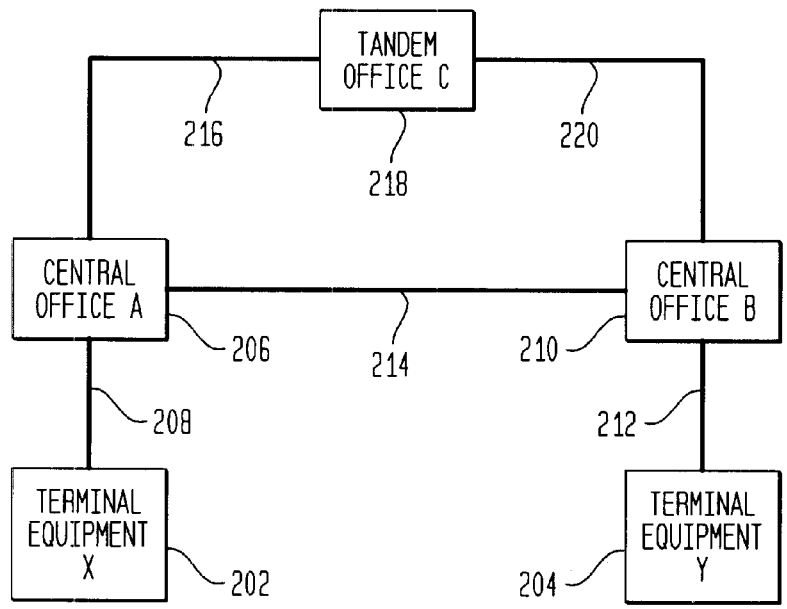
FIG. 2 is a block diagram showing the connection of two pieces of terminal equipment at customer premises served by separate central offices.
Figure 3A:
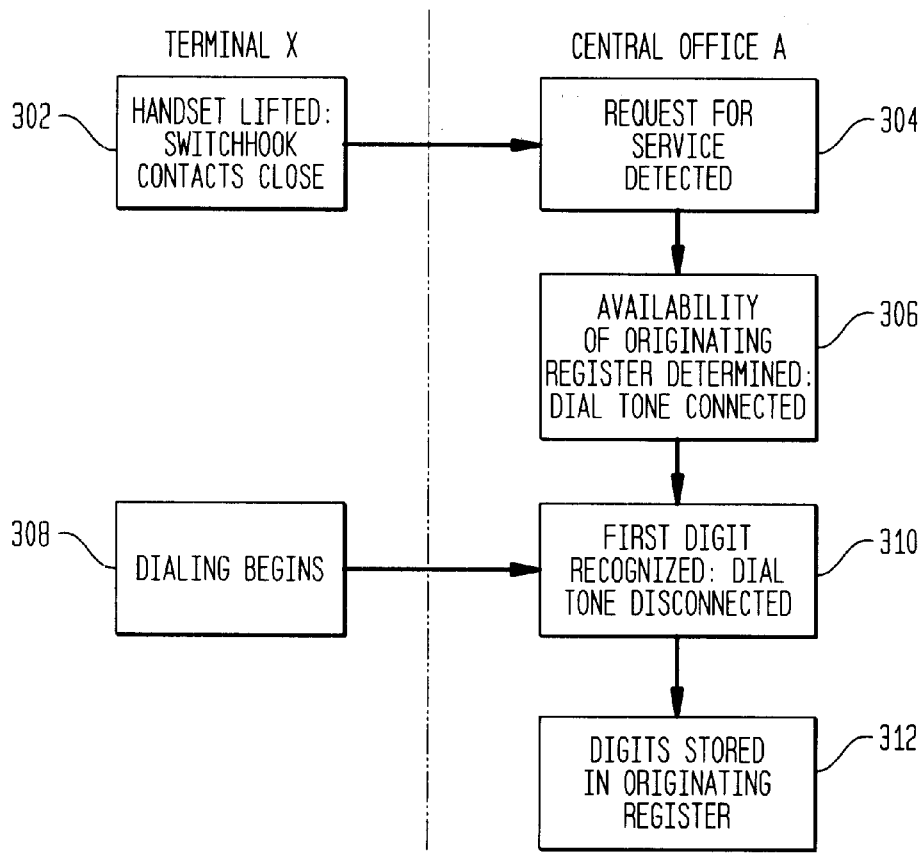
FIGS. 3a through 3d depict a flow diagram which illustrates steps involved with initiating a call, processing the call, and terminating the call, in a system using "in-band" signaling.
Figure 3B:
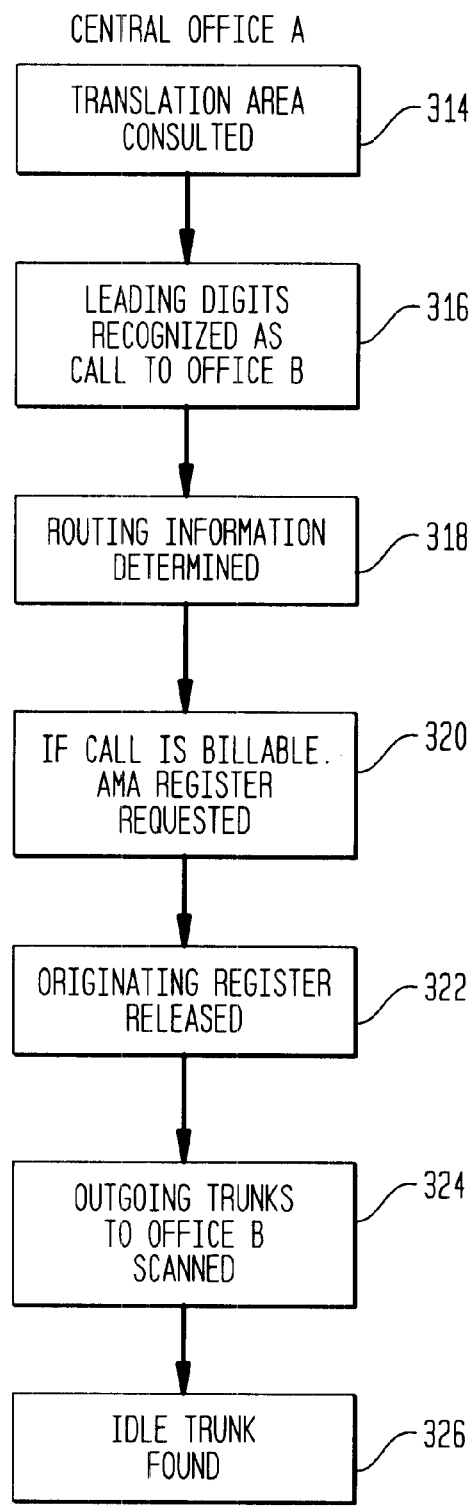
Figure 3C:
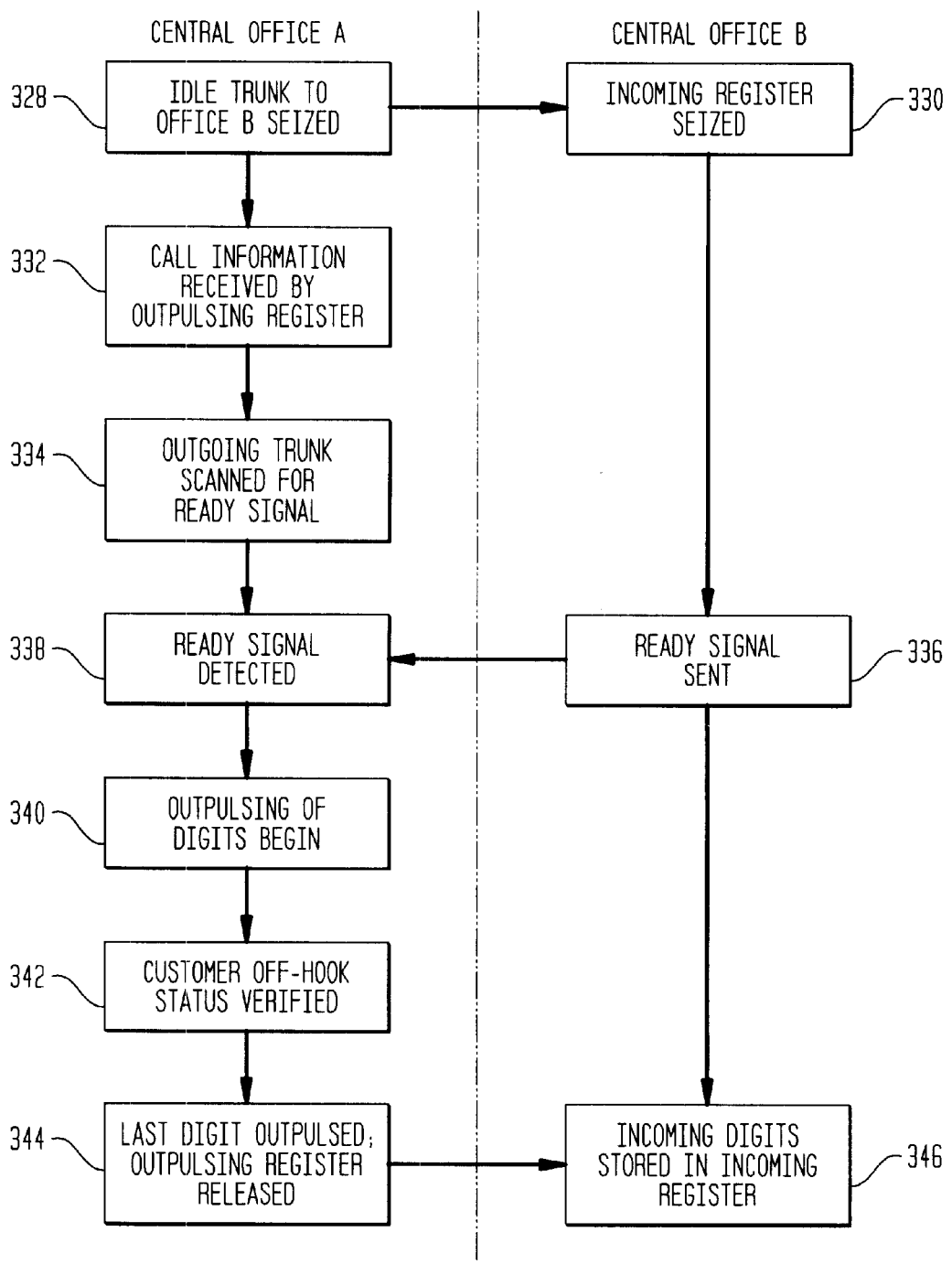
Figure 3D:
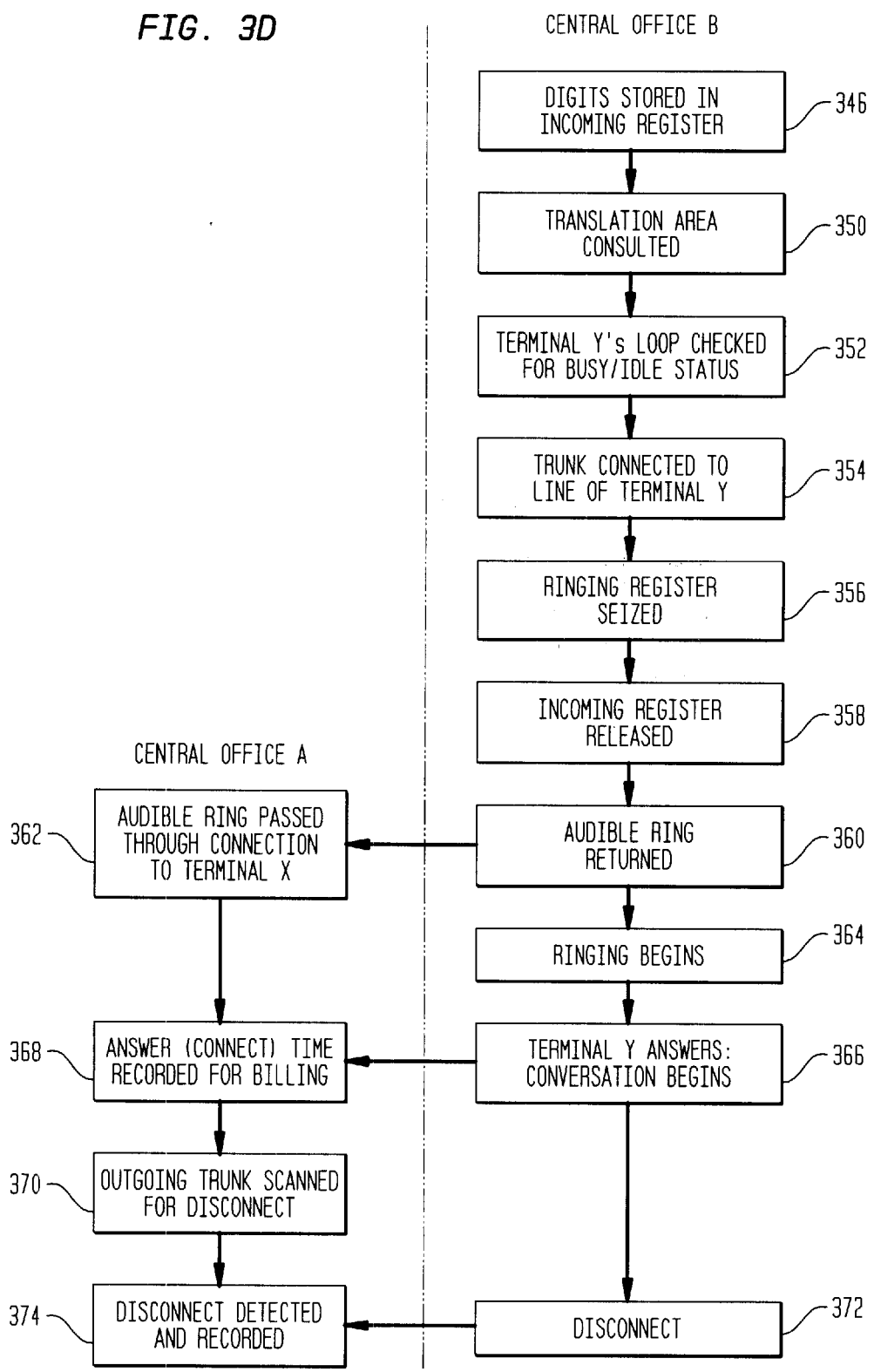
Figure 4:
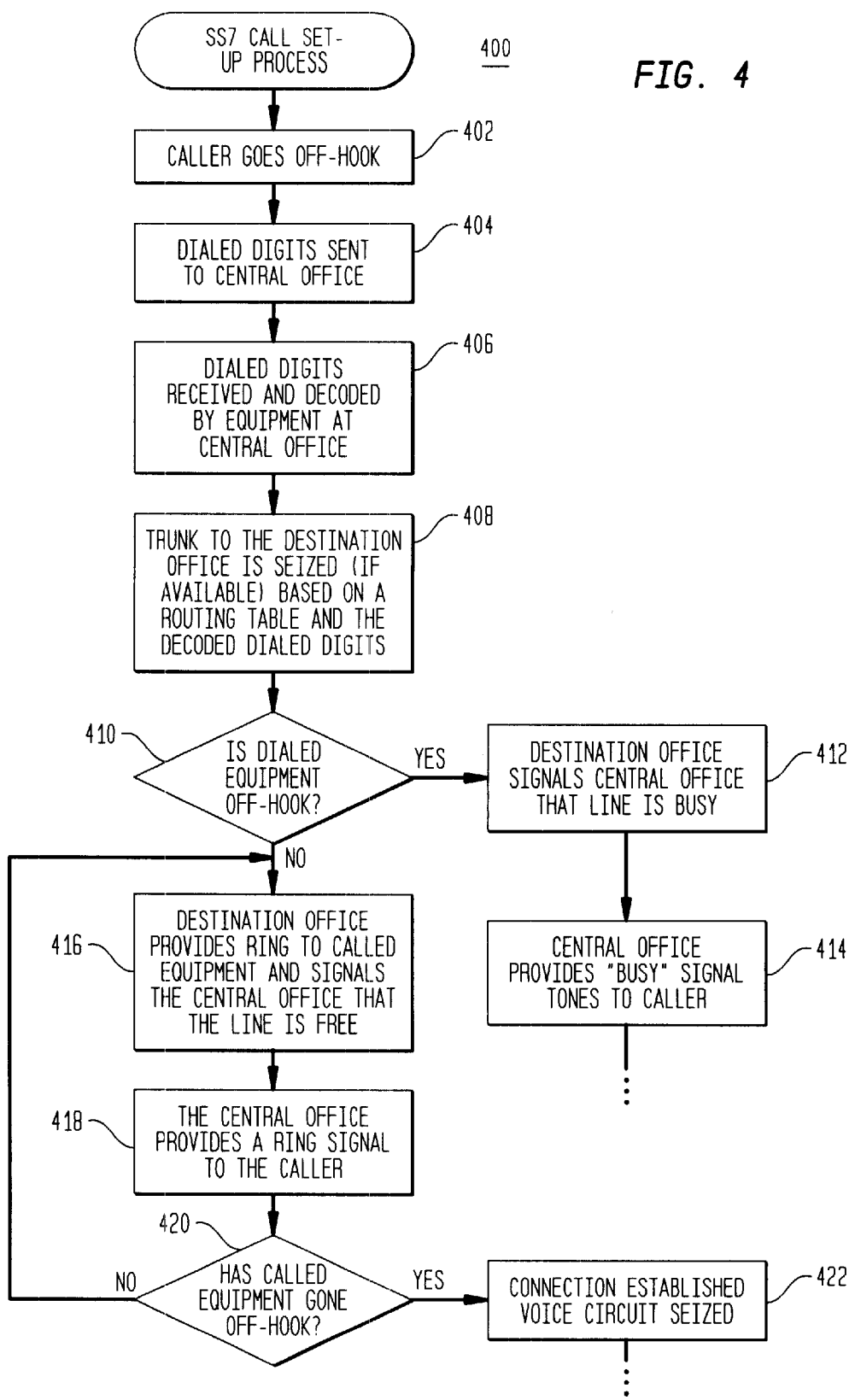
FIG. 4 is a flow diagram which illustrates the steps involved in setting up a call in a system using "out-of-band" signaling such as SS7.
Figure 6:
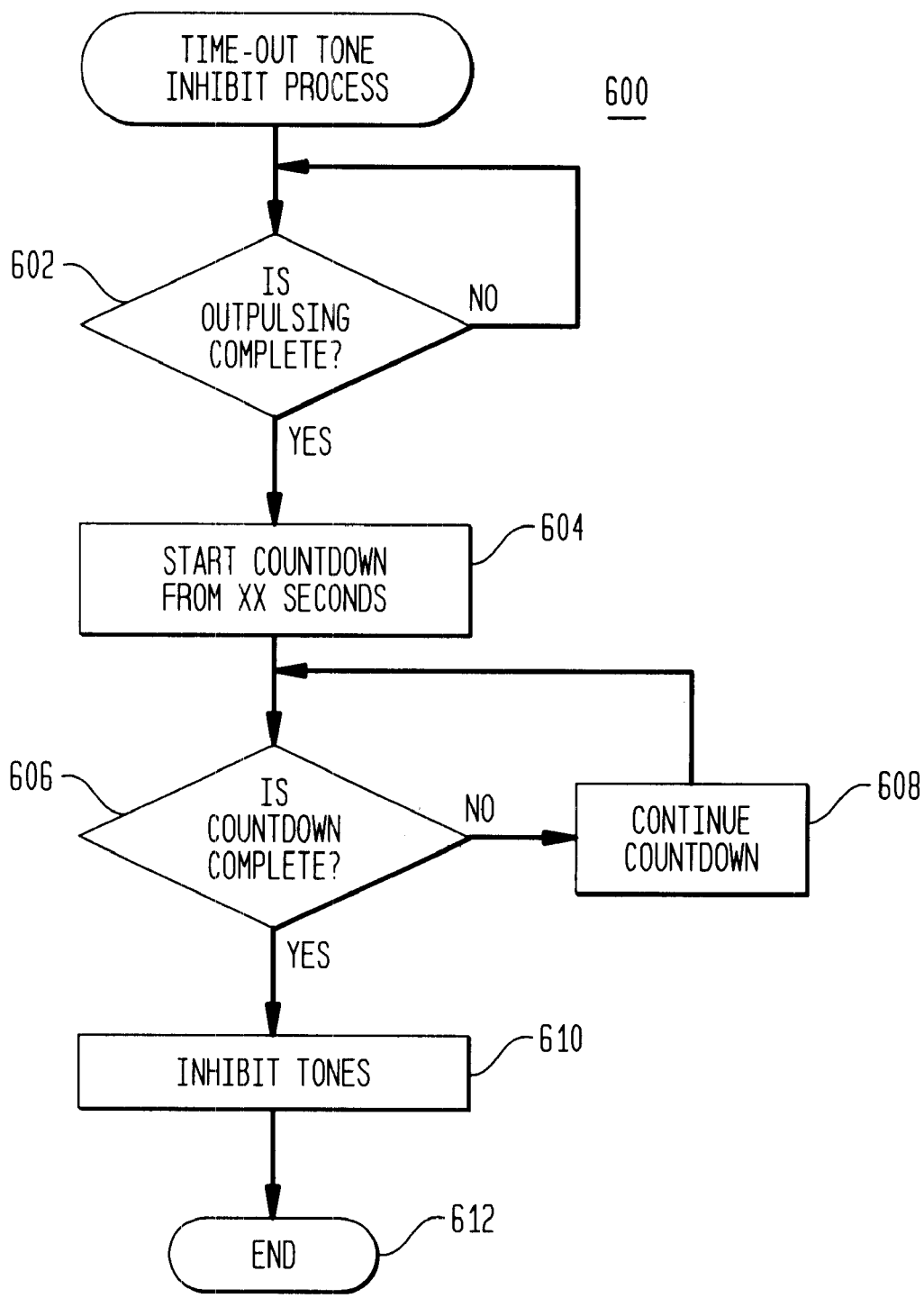
FIG. 6 is a flow diagram of a time-out method for invoking a call tone inhibit function.
Figure 7:
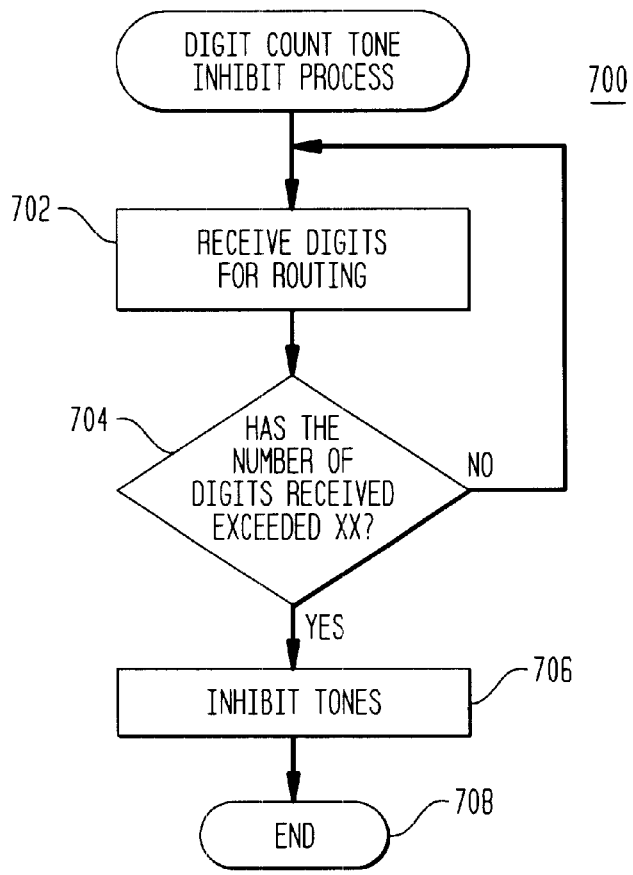
FIG. 7 is a flow diagram of a digit count method for invoking a call tone inhibit function.
Figure 8:
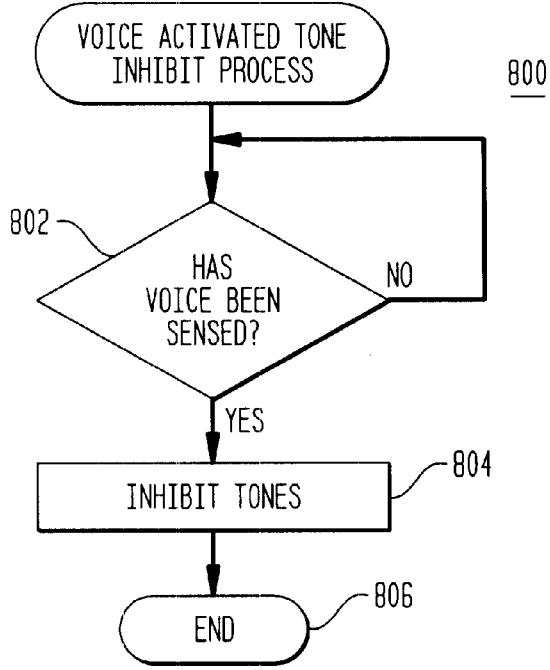
FIG. 8 is a flow diagram of a voice detection method for invoking a call tone inhibit function.

Irrespective of the placement of the call tone inhibit device of the present invention, such a device is preferably invoked after the call is set up. FIGS. 6 through 8 are flow diagrams which illustrate various ways of approximating when the call is set up. FIG. 6 is a flow diagram of a time-out process 600 used to invoke the tone inhibit device. First, as shown in step 602, it is determined whether dialing is complete. This can be done by the processor module unit 1118 for example. As shown in step 604, if the outpulsing is complete, a countdown is started from a predetermined number of seconds, such as five (5) seconds for example. As shown in steps 606 and 610, once the countdown is complete, one or more call tones are inhibited with the device of the present invention. The countdown can be carried out by the processor module unit 1118 for example. Alternatively, the DSP carrying out the call tone inhibit function may also be configured and/or programmed to carry out the countdown.

The time-out process 600 may be advantageously used to ensure that explosive Internet use does not disrupt connection reliability and service levels of a central office. More specifically, Internet service providers (or "ISPs") or enhanced service providers (or "ESPs") have experienced explosive growth during the mid-1990s as customers desire access to the Internet and other proprietary networks. This explosive growth, coupled with the typical usage patterns of the use of the Internet, has created unique service problems for regional bell operating companies (RBOCs) and other telephone service providers. In many instances, users, accessing the Internet through a local Internet provider, may occupy a line, maintained by the switching network of a central office, almost continuously during certain hours. Further, Internet service providers (or ISPs) have typically bought small numbers of 1MB (or "1 Message Business") lines; 1MB being a tariffed service developed to handle voice traffic of about 3 CCS (or 3 hundred call seconds). Consequently, a central office having a switching network engineered for traffic expected to be 3 CCS, or even 6 CCS, must handle traffic which, in many instances, approaches 36 CCS.

It was first thought that most Internet or on-line activity would occur during early morning hours. If this were the case, such heavy "data type" usage during light traffic periods would have better utilized embedded investment in switching and transmission facilities, thereby contributing to the revenue stream of RBOCs and other telephone service providers at times when very few calls are made. Unfortunately, however, recent studies of certain Internet service provider lines have indicated that traffic is heavy during the daytime. This unanticipated heavy traffic caused by high usage customers, such as Internet service providers for example, has loaded down switching networks and associated analog line units at central offices of regional bell operating companies (RBOCs) and other telephone service providers. Again, analog line units provide dial tone, ringing, and access to the loop or line side of the switching network. Regional Bell Operating Companies (RBOCs) are regulated by the Public Service Commission and must meet certain minimum service level requirements. For example, ordinary telephone customers expect, and the Public Service Commission requires, that dial tone will be provided when a customer takes the handset of their telephone off-hook. However, in instances where high usage customers, such as Internet service providers, are encouraging usage of a central office switching network far in excess of its engineered capacity, service level problems (e.g., no dial tone) result.

In the past, the average call lasted three minutes. However, it has been reported that the average Internet session lasts 20 minutes. As discussed above, central offices were simply not designed and engineered to handle the increased levels of traffic caused by Internet (and other data access) users. Additional resources are required to increase the capacity of the central office to handle such traffic. By using the time-out process 600 to inhibit call tone(s) (or other data transmission tone(s)) after about three (3) minutes (or between three and twenty minutes), telephone service providers can prevent long Internet use. Such use may be permitted if additional fees are paid to compensate such telephone service providers for the increased resources required to handle the increased traffic.

FIG. 7 is a flow diagram of a digit (or call tone) count process 700 used to invoke the tone inhibit device. First, as shown in step 702, the digits needed to route the call are received. As discussed above with reference to FIG. 11, the processor module unit 1118 receives the decoded dual tones from the code receiver 116 and determines when the call may be routed. Next, as shown in steps 704 and 706, if the number of digits received has exceeded a predetermined value, such as 12 for example, the call tone inhibit device is invoked. The digit (or call tone) count process can be used to prevent the long Internet use, discussed above. The digit count can be carried out by the processor module unit 1118 for example. Alternatively, the DSP carrying out the call tone inhibit function may also be configured and/or programmed to carry out the digit count.

FIG. 8 is a flow diagram of a voice detection process 800 used to invoke the tone inhibit device. As shown in steps 802 and 804, if a voice has been sensed, the call tone inhibit device is invoked. A known voice determination device (such as the ANTARES of DSP Algorithm Integration Platform by Dialogic for example) is used to determine the presence of voice. Alternatively, voice determination can be carried out by the DSP. As discussed above with reference to FIG. 11, voice will only be provided across the group switch 1199a after the call is set. Therefore, the voice determination device is preferably located in the link interface unit for example.

Thus, the present invention provides a number of methods for determining when to invoke the call tone inhibit device of the present invention. If, however, the call tone inhibit device(s) is arranged downstream of the branch 1190b in the voice channel to the code receiver 1116, the call tone inhibit device may be always invoked; that is, without regard to whether or not the call has been set up or not, or any other criteria (but may, however, inhibit call tone(s) periodically or intermittently). This system may be used, for example, to (i) prevent unauthorized use of call tones by children, (ii) prevent abuse by dial pulse subscribers, and (iii) permit telephone companies to generate revenues commensurate with the use of call tones.

The embodiments described herein are merely illustrative of the principles of the present invention. Various modifications may be made thereto by persons ordinarily skilled in the art, without departing from the scope or spirit of the invention.

What is claimed is:

1. A method for preventing an unauthorized calling party on a telephone network from controlling apparatus responsive to in-band signalling following the set up of a call, comprising:

determining whether the calling party is authorized to use in-band signalling to control the apparatus following the set up of a call, where the determination is made by the telephone network;

determining when the process of setting up a call has been completed; and in response to the determination that the calling party is not authorized to use in-band signalling following the set up of a call and the determination that the process of setting up a call has been completed, preventing the unauthorized calling party from using in-band signalling to control the apparatus, the step of preventing comprising the step of blocking transmission of at least one frequency selected from a group consisting of 697 Hz, 770 Hz, 852 Hz, 941 Hz, 1209 Hz, 1336 Hz, 1477 Hz, and 1633 Hz.

2. The method of claim 1, wherein the step of blocking comprises the step of notch filtering.

3. The method of claim 2, wherein the step of notch filtering is applied continuously.

4. The method of claim 2, wherein the step of notch filtering is applied periodically.

5. The method of claim 2, wherein the step of notch filtering is applied intermittently.

6. A method for preventing an unauthorized calling party on a telephone network from controlling apparatus responsive to in-band signalling following the set up of a call, comprising:

determining whether the calling party is authorized to use in-band signalling to control the apparatus following the set up of a call, where the determination is made by the telephone network;

determining when the process of setting up a call has been completed; and in response to the determination that the calling party is not authorized to use in-band signalling following the set up of a call and the determination that the process of setting up a call has been completed, preventing the unauthorized calling party from using in-band signalling to control the apparatus, the step of preventing comprising blocking transmission of at least one frequency selected from a group consisting of 697 Hz, 770 Hz, 852 Hz, and 941 Hz; and blocking transmission of at least one frequency selected from a group consisting of 1209 Hz, 1336 Hz, 1477 Hz, and 1633 Hz.

7. The method of claim 6, wherein the step of blocking comprises the step of notch filtering.

8. The method of claim 7, wherein the step of notch filtering is applied continuously.

9. The method of claim 7, wherein the step of notch filtering is applied periodically.

10. The method of claim 7, wherein the step of notch filtering is applied intermittently.

11. A method for preventing an unauthorized calling party on a telephone network from controlling apparatus responsive to in-band signalling following the set up of a call, comprising:

determining whether the calling party Is authorized to use in-band signalling to control the apparatus following the set up of a call, where the determination is made by the telephone network;

determining when the process of setting up a call has been completed, the process comprising the step of determining that a predetermined period of time has passed; and in response to the determination that the calling party is not authorized to use in-band signalling following the set up of a call and the determination that the process of setting up a call has been completed, preventing the unauthorized calling party from using in-band signalling to control the apparatus, the step of preventing comprising the step of blocking transmission of at least one frequency selected from a group consisting of 697 Hz, 770 Hz, 852 Hz, 941 Hz, 1209 Hz, 1336 Hz, 1477 Hz, and 1633 Hz.

12. The method of claim 11, wherein the step of determining a time comprises the step of determining that the call has been set up.

13. The method of claim 11, wherein the step of determining a time comprises:

i) determining when dialing is complete; and ii) waiting a predetermined period of time.

14. The method of claim 13, wherein the predetermined period of time is approximately three minutes.

15. The method of claim 13, wherein the predetermined period of time is between about three minutes and twenty minutes.

16. The method of claim 11, wherein the step of determining a time comprises:

i) receiving dialed digits;

ii) counting the dialed digits received to form a number; and iii) determining when the number of received dialed digits exceeds a predetermined number.

17. The method of claim 11, wherein the step of determining a time comprises the step of determining when a voice is present on a voice circuit.

18. A method for preventing an unauthorized calling party on a telephone network from controlling apparatus responsive to in-band signalling following the set up of a call comprising, in response to a determination that the calling party is not authorized to use in-band signalling to control the apparatus following the set up of a call and completion of the process of setting up a call, preventing the unauthorized calling party from using in-band signalling to control the apparatus, the step of preventing comprising the step of blocking transmission of at least one frequency selected from a group of call tones used for in-band signaling.

19. A system for preventing an unauthorized calling party on a telephone network from controlling apparatus responsive to in-band signalling following the set up of a call, comprising:

means, located in the telephone network, for determining whether the calling party is authorized to use in-band signalling to control the apparatus following the set up of a call;

means for determining when the process of setting up a call has been completed; and means, responsive to the means for determining whether the calling party is authorized to use in-band signalling to control the apparatus following the set up of a call and the means for determining that the process of setting up a call has been completed, for preventing the unauthorized calling party from using in-band signalling to control the apparatus, the means for preventing comprising means for blocking transmission of at least one frequency selected from a group consisting of 697 Hz, 770 Hz, 852 Hz, 941 Hz, 1209 Hz, 1336 Hz, 1477 Hz, and 1633 Hz.

20. A system as set forth in claim 19, where the means for determining when the process of setting up a call has been completed comprises means for determining when the entry of digits identifying the called party has been completed.

21. A system as set forth in claim 19, where the means for determining when the process of setting up a call has been completed comprises means for determining when a period of time has passed.

22. A system as set forth in claim 19, where the means for determining when the process of setting up a call has been completed comprises means for determining when a voice channel has been established.

23. A system as set forth in claim 19, where the means for preventing propagation of in-band signalling comprises means for preventing propagation periodically or intermittently.

24. A method for preventing an unauthorized calling party on a telephone network from controlling apparatus responsive to in-band signalling following the set up of a call, comprising:

determining whether the calling party is authorized to use in-band signalling to control the apparatus following the set up of a call, where the determination is made by the telephone network;

determining when the process of setting up a call has been completed; and in response to the determination that the calling party is not authorized to use in-band signalling following the set up of a call and the determination that the process of setting up a call has been completed, preventing the unauthorized calling party from using in-band signalling to control the apparatus.

* * * * *